Jan. 2, 1945. J. H. RIEGER 2,366,652
MODEL CONSTRUCTION
Filed Oct. 30, 1942 2 Sheets-Sheet 1

INVENTOR
James H. Rieger
By John T. Manvin
his ATTORNEY

Jan. 2, 1945. J. H. RIEGER 2,366,652
MODEL CONSTRUCTION
Filed Oct. 30, 1942 2 Sheets-Sheet 2

INVENTOR
James H. Rieger
By John P. Marvin
his ATTORNEY

Patented Jan. 2, 1945

2,366,652

UNITED STATES PATENT OFFICE 2,366,652

MODEL CONSTRUCTION

James H. Rieger, Dayton, Ohio

Application October 30, 1942, Serial No. 463,865

1 Claim. (Cl. 46—76)

This invention relates to models and particularly to scale model airplanes, and methods of making the same.

An object of the invention is to provide a kit containing all of the parts for a scale model, which parts may be assembled and brought to the desired shape without expensive tools or exceptional ability on the part of the assembler.

In carrying out the above object it is a further object to provide a knocked down model which carries a plurality of relatively thin plies which are for the most part of somewhat similar shape but are of progressively less area whereby plies may be assembled progressively upon the largest ply to form a model having an irregular outer contour but wherein the assembly assumes the desired shape upon removal of the irregular portions.

Another object is to provide a knock-down model kit for an airplane wherein the fuselage at least is formed of a laminated wooden construction comprising a plurality of plies of ever decreasing area using the center ply as an index and wherein a fuselage is formed which has approximately the desired contour but includes irregularities thereon as occasioned by the edges of the plies, said irregularities being easily removed by sanding for bringing the outer contour to substantially the contour desired.

A still further object of the invention is to provide a knock down model kit which requires the assembler to manually operate upon the parts to bring them to exact dimensions and shape but which is so arranged as to prevent improper shaping due to inexperience or lack of ability on the part of the assembler. This object is of prime importance as it permits use of the kit by all manner of persons who, after assembly and shaping, have an accurate model and also have the pride attendant to making such a model. This pride is not present when the parts in a knock down kit are already shaped and only require simple assembly. On the other hand, kits which only supply rough stock with blueprints, often discourage an inexperienced worker who lacks adequate tools and thereby destroys all of the pleasure of working with the kit. My invention provides a kit that appeals to all classes of model makers; it requires assembly, shaping and other manual manipulations to obtain the model while simultaneously being set up in such a manner as to eliminate discouragement due to inexperience, lack of tools, etc.

Further objects and advantages of the present invention will be apparent from the following description, reference being had to the accompanying drawings wherein preferred embodiments of the present invention are clearly shown.

Figure 1:
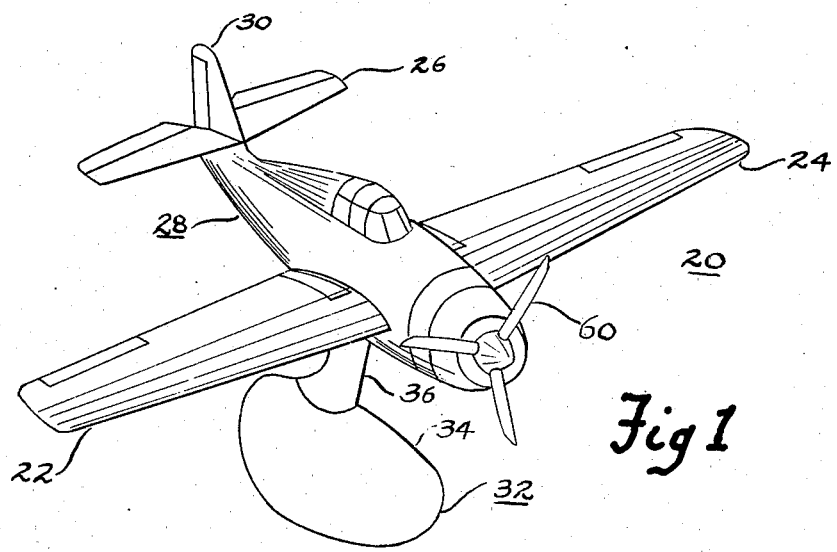
Fig. 1 is a view in perspective of a finished scale model of an airplane displayed upon a standard.

The following description will be confined to a model airplane such as is shown at 20 in Fig. 1. It is understood however that other models may be made in a similar manner and this description in no way limits my invention to model airplanes being only illustrative of one application of the invention.

The plane 20 includes two wing sections 22 and 24 together with a tail wing 26.

Figure 6:
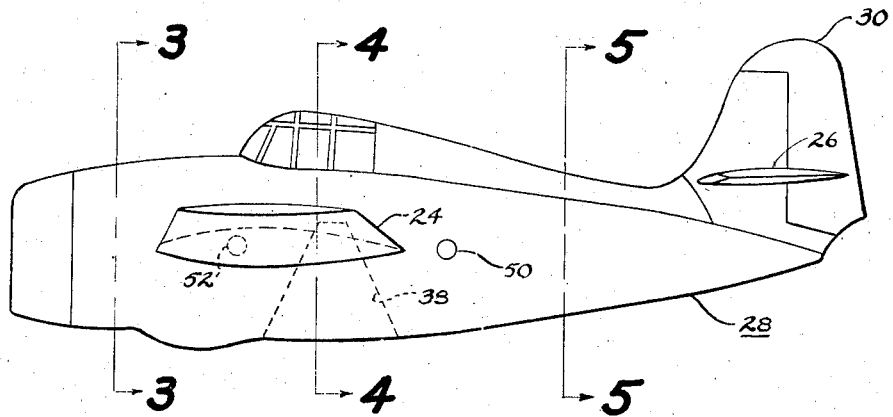
Fig. 6 is a side view of the completed model without the propeller.
Figure 7:
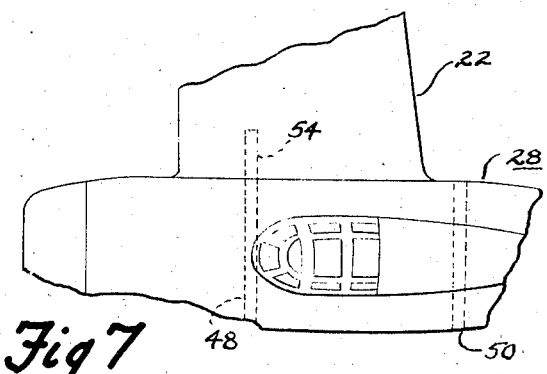
Fig. 7 is a fragmentary top view of the plane showing the use of one of the fuselage dowels as a wing attachment means and Fig. 8 is an expanded view of the propeller assembly.

A fuselage assembly 28, to be described hereinafter is provided as a carrier for the wing parts and likewise includes a tail fin 30. The plane 20 is removably mounted on a standard 32 which includes a base 34 and an upright 36 which has a rounded end thereon that is adapted to fit into a slot 38 of substantially triangular shape as shown in dotted lines in Fig. 6. This mounting permits the plane 20 to be displayed in any one of a plurality of flying positions, the more important being, in a dive, in a climb or during level flight.

The fuselage 28 of the plane 20 is built up from a number of plies 40, 42, 43, 44, 45 and 46, preferably of wood which is cut to the shapes illustrated. The center ply 40 is the largest in area and is positioned as an index from which the fuselage is built. The ply 40 includes a triangular cut out which forms slot 38 with the other plies. Plies 42, 43, 44, 45 and 46 are each progressively smaller in area and are used in duplicate, one of each being disposed on each side of the center ply 40.

The plies are all drilled for the entry of two dowel pins 48 and 50.

Figure 2:
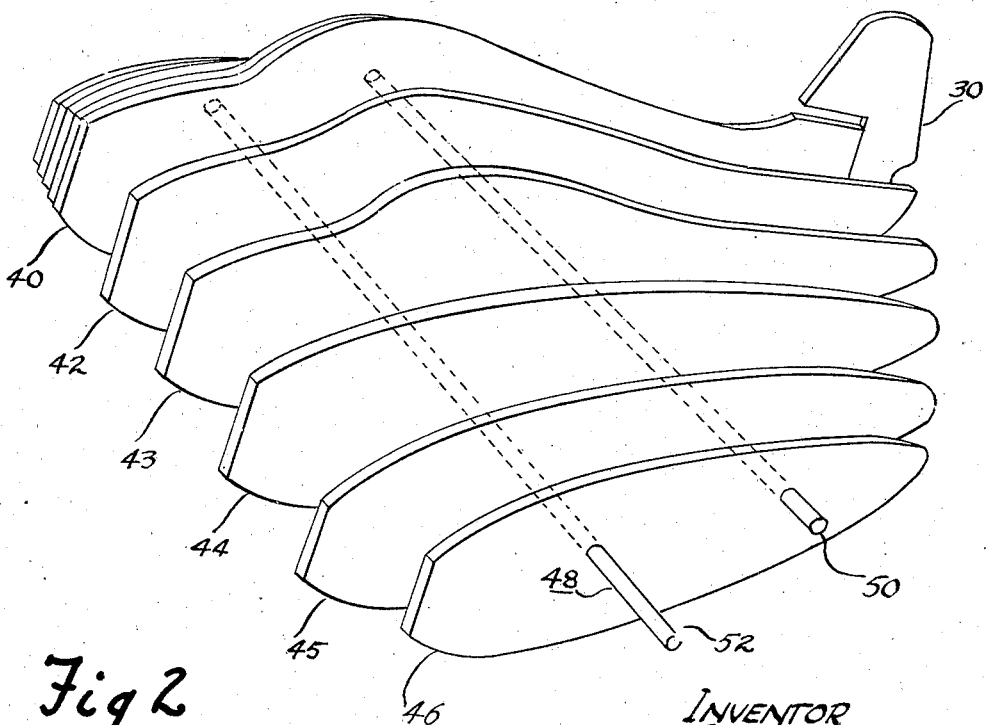
Fig. 2 is an expanded view of the fuselage prior to final assembly and shaping, showing the plies which go to make up the assembly.

In assembly, the dowel pins 48 and 50 are passed through the center ply 40 and then one side of the ply is uniformly spread with glue whereupon the next ply 42 is assembled on the dowels. This procedure is continued until all of the plies are assembled after which the assembly is clamped together and the glue is allowed to set. The tail wing 26 and tail fin 30 are next cemented or glued in place as shown. The tail fin 30 fits within a slot formed between plies 42 which extends beyond center ply 40 when the fuselage is assembled while the tail wing fits between the tail fin and fuselage by assembly of the tail fin so as to leave a slot of the desired width as shown in Fig. 2.

Figure 3:
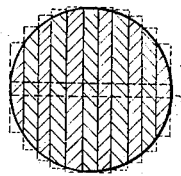
Fig. 3 is a view in section taken on line 3—3 of Fig. 6 showing, in dotted lines, the material which is removed during shaping.
Figure 4:
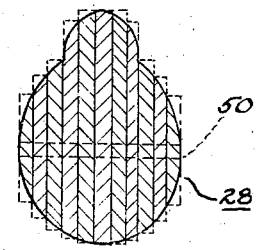
Fig. 4 is a view in section taken on line 4—4 of Fig. 6 showing, in dotted lines, the material which is removed during shaping.
Figure 5:
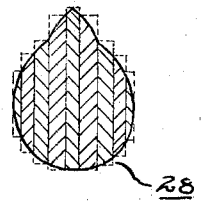
Fig 5 is a view in section taken on line 5—5 of Fig. 6 showing, in dotted lines, the material which is removed during shaping.

After assembly of the fuselage, the outer contour thereof is substantially that desired but is irregular being made up of a plurality of longitudinally extending steps as formed by the edges of the plies. Cross sections of the fuselage are shown in Figs. 3, 4 and 5 wherein the dotted lines indicate the irregular outer contour thereof. I next propose to remove the steps by carving or sanding, preferably sanding until the rough or irregular surface is brought to a smooth surface as indicated in solid lines in Figs. 3, 4 and 5 at which time the contour of the fuselage is correct.

Thus the preformed shape of the plies governs the final shape or contour of the model since, when the surplus material is removed to provide a smooth contour, the shape of the model is apparent. In this manner even the most inexperienced worker can make a model of exact and graceful lines by merely sanding the built up model until irregular steps in the outer surface thereof are removed.

After the fuselage is completed, the wing sections 22 and 24 which have previously been sanded to a smooth taper may be mounted. In order to provide a strong accurately spaced mounting, I prefer to make the dowel pin 48 of greater length than necessary so that the ends 52 thereof extend from the fuselage 28. The wing sections 22 and 24 are drilled as at 54 to receive the protruding ends 52 of the dowel 48. In assembly the ends 52 of the dowels are glued within the drilled holes 54 and the remainder of the end of the wing sections 22 and 24 are glued to the fuselage 28. In this manner, wings 22 and 24 are properly positioned and strongly attached to the fuselage without the necessity of measurement. It is apparent that wings may be attached in other manners but where the design of the plane permits, I prefer to use the means described herein.

The rudder, elevators, catwalks, insignia, etc., are attached to the plane by using either glued paper sections or decalcomanias.

Figure 8:
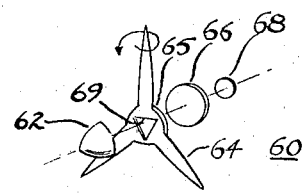

The propeller assembly 60, preferably made of cardboard and shown in expanded form in Fig. 8, comprises a spinner 62 of cupped form, a propeller 64 having 3 blades and three washers 65, 66 and 68. Washer 65 is glued to the back of propeller 64 and then a standard pin, not shown, is passed through washers 65, 66 and 68 and the end thereof is driven into the nose portion of the fuselage. The propeller 64 has a triangular aperture 69 therein so that the head of the pin does not protrude. After assembly of the propeller to the fuselage the spinner 62 is glued thereto to cover the pin. The pitch on the propeller blades is provided by twisting the blades in the direction of the arrows in Fig. 8. In some cases it may be desirable to make the propeller from three portions wherein the ends are butted to form a triangular aperture after the blades have been glued to the washer 65; also the washers 66 and 68 may be glued together and to the washer 65.

Although the exemplary form of the invention has been limited to the formation of an airplane model, it is apparent that the wings, for example, can likewise be built up out of a plurality of preformed sections or laminae and may have their stepped edges sanded down to form a smooth contour. Similarly, other types of models may be formed by a like procedure, the invention not being limited in scope to airplane models.

From the foregoing it is apparent that I have provided a kit from which models may be easily fabricated to scale model dimensions without special tools or ability.

While the embodiments of the present invention as herein disclosed, constitute preferred forms, it is to be understood that other forms might be adopted, all coming within the scope of the claim which follows.

What is claimed is as follows:

A scale model airplane, comprising in combination; a relatively thin central wooden ply, a plurality of similarly shaped relatively thin wooden plies of progressively less area than said central ply and adapted to be arranged on both sides of said central ply, said central ply and each of said other plies having an aperture therethrough, the two plies immediately adjacent said central ply and on either side thereof being of greater length than the central ply to form a slot therebetween, a dowel pin adapted to pass through all of said apertures in the plies and thereby align the plies so that the plies can be glued together to form a fuselage including a plurality of longitudinally extending irregularities on its outer contour as caused by the edges of said plies, and adapted to take the correct shape when said irregularities are sanded down to provide a smooth contour, said dowel pin extending a substantial distance beyond the fuselage at both sides thereof, a tail fin having substantially the same thickness as said central ply and adapted to be assembled to said fuselage by partial insertion into said slot for forming a second slot extending laterally with respect to said first slot and positioned between the fuselage and the tail fin, a tail wing adapted to fit into said second slot and be positioned thereby with respect to the tail fin, and two main wing sections each having a recess therein at the portion thereof adapted to abut the fuselage whereby the wing sections can be attached to and positioned with respect to the fuselage by placement of the ends of said dowel pin in said recesses.

JAMES H. RIEGER.